May 12, 1942.  J. A. POTTER  2,282,494
ILLUMINATION CONTROL FOR VISION-TEST CHARTS
Filed May 3, 1940
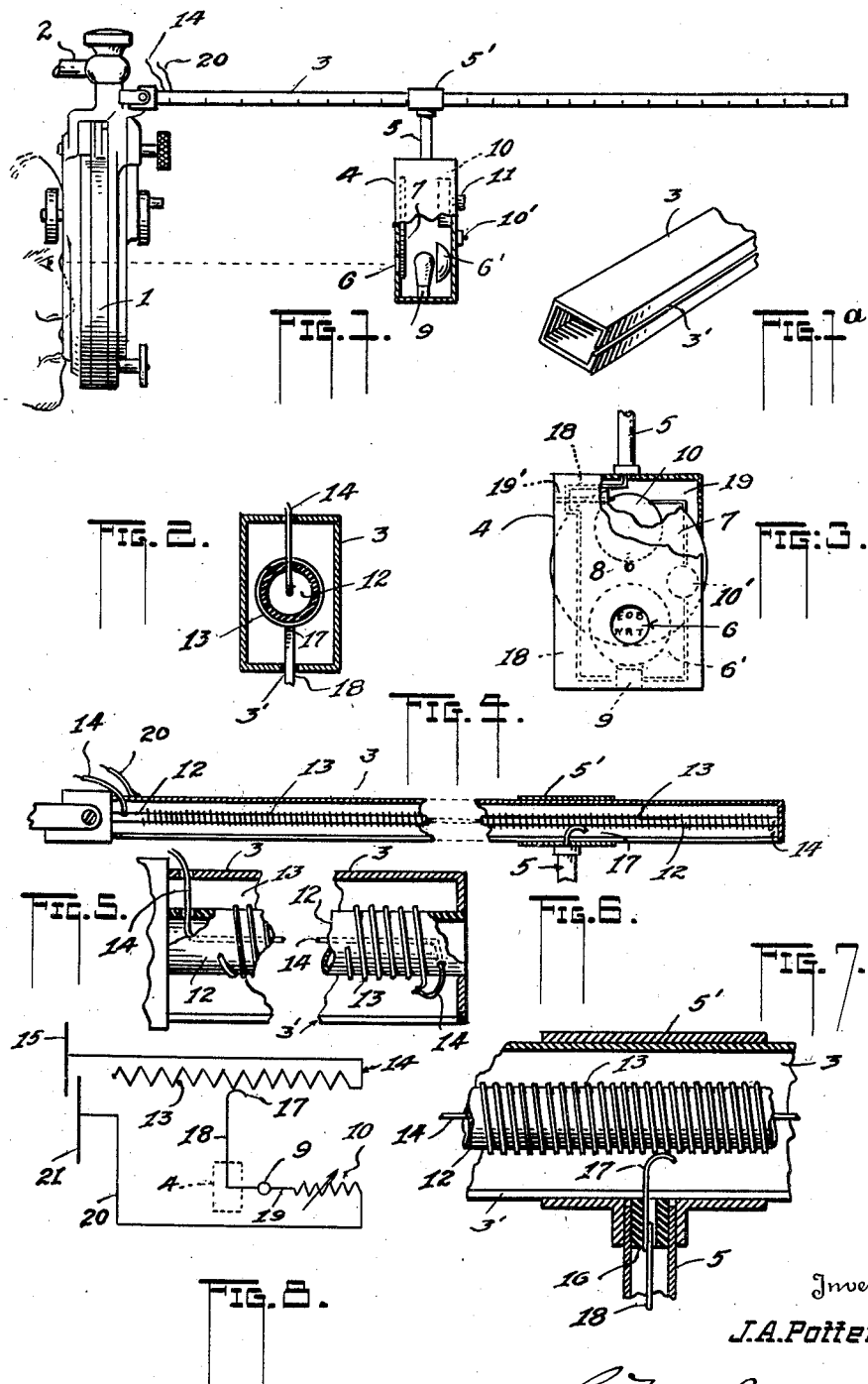
Inventor
J. A. Potter,
By L. M. Hurlout
Attorney Patented May 12, 1942

2,282,494

UNITED STATES PATENT OFFICE 2,282,494

ILLUMINATION CONTROL FOR VISION-TEST CHARTS

Jack Arthur Potter, Peoria, Ill.

Application May 3, 1940, Serial No. 333,104

3 Claims. (Cl. 88—20)

This invention pertains to light control means for use in testing vision as applied to phorometers, refractors, and the like. More particularly the invention provides for maintaining an equal degree of brightness of illumination of a testing chart or card at any distance thereof from the eye of a patient during so called "near point test" in the practice of optometry.

An object of the invention is to control a source of light, the rays from which are thrown upon or through a test chart, to the end that the latter will be illuminated as brightly at its greatest distance from the eye of a patient as when in close portion thereto.

Another object is to automatically and progressively vary the illuminating power of a light during the adjustment of a test chart with respect to a patient's eye whereby the same light value is maintained upon the said chart at near and distant positions of the latter by which to provide a more accurate vision test.

Still another object lies in stationing an electric lamp adjacent a test chart to move therewith during "near point tests" of vision, and by means of a variable resistance placed in the electric circuit to automatically vary the illumination of said lamp in accordance with the position of adjustment of said chart to the end that whether the latter is at a nearest or farthest distance from the eye the illumination reaching the eye from the chart will be of equal value.

Again an object is to so automatically control a light source fixed in position with respect to a test chart, and whose rays are directed upon said chart, that in the adjustment of the latter with respect to distance from the eye being tested an equal amount of light will reach the eye from said chart in any adjusted position of that member.

Further, to provide means for the purpose named adapted for attachment to any type of phorometer, refractor, or phoropter.

The accompanying drawing forming part hereof illustrates a form of device answering the requirement of the invention, it being understood, however, that other ways of accomplishing the result may be used since it is not the purpose to be limited to the specific arrangement shown.

Figure 1 is a side elevation of parts of a refractor of a well known type showing my invention applied thereto.

Figure 1ª illustrates in perspective a part of a rod or arm shown in Figure 1 showing a slit wall thereof;

Figure 2 is a transverse section of an arm or rod shown in Figures 1 and 1ª much enlarged.

Figure 3 is a front elevation of a chart carrying light-box shown in Figure 1, the same being shown much enlarged.

Figure 4 is a longitudinal section of an arm shown in some of the earlier figures, together with structural details of other parts;

Figures 5 and 6 are longitudinal sections of parts of the rod or arm shown in Figure 4 greatly enlarged;

Figure 7 is also a longitudinal section of the rod or arm similar to that of Figures 5 and 6, including other structural portions, and Figure 8 is a diagram of an electric circuit as employed according to the invention as one manner of arrangement for the purpose.

Denoted at 1, Figure 1, is a portion of a refractor which, of course, comprises a testing lens, not shown, such an instrument being well known, and in general use, and herein shown suspended from an arm 2 as part of a supporting standard, not shown.

Attached to and extending from the front side of the refractor 1 is a support, such as a rod or arm 3, common to devices of this nature, and which is made use of in my invention, having, however, certain alterations or additions to be presently made known herein.

At 4 is what shall be termed hereing as a light-box as a holder for a test chart or target and suspended from the arm 3 by a structure 5 including a sleeve 5' slidably fitting upon said rod.

The front wall of said light box has an opening 6 behind which, and within said box, Figure 3, is a chart or target 7, which in this instance is translucent, mounted to rotate about a point of support 8, for example, and having any usual test characters thereon to be exposed at said opening 6. In this instance an electric lamp 9 is located within the light box, said chart being interposed between said lamp and the named opening 6, a reflector 6', if desired, being also indicated. Also in said box 4 is a rheostat 10 controlled by choice from outside the box by a knob 11.

The rod or arm 3 previously mentioned is preferably rectangular in form and tubular, the lower wall of which has a longitudinally extending slit 3' as shown in Figure 1ª for a purpose to appear. Extending through the rod longitudinally within the space thereof is a core 12 of nonconducting material spaced from the walls of the rod, the ends thereof being supported in any suitable manner. A resistance wire 13 is wound upon the core one end thereof having connection with a conductor 14 leading to a current conductor 15, see Figure 8. In this instance, only, the core 12 is tubular, the conductor 14 extending therethrough as shown in Figures 2, 5 and 6. As illustrated in Figure 1 the structure 5 by which to suspend the light-box 4, Figure 3, is tubular and may have an insulating member 16 fitted thereon to which is affixed in any suitable manner a flexible contact portion 17 which extends into the rod or arm 3 through the slit 3', and adapted to have sliding contact with the convolutions of the resistance wire 13, said portion 17 having connected thereto a conductor 18 which extends into said box 4 and has connection with one side of the lamp 9, see Figures 1, 3 and 8. The other side of the lamp is connected by a wire 19 to one side of the rheostat 10 while the other side of the latter may be grounded on said box 4 by a wire 19', the current passing from the box and the sleeve 5' to the rod 3 thence to the main lead by conductor 20.

It is thus noted that the lamp 9, the rheostat 10, and the resistance wire 13 are all in circuit with the leads 15 and 21. Further, that whatever the position of the contact portion 17 at the resistance wire 13, with the lamp giving a certain degree of illumination, the adjustment of the rheostat will alter the strength of the light, making it greater or less, depending of course, upon whether the resistance is decreased or increased.

In practice with the parts assembled as in Figure 1, the circuit being closed through the lamp 9, the operator upon placing the light box 4 at the desired distance from the eye of the patient then sets the rheostat to obtain the desired intensity of light for the proper reading of the chart characters. This having been done with the resistance 13 in circuit it is clear that in any adjustment of the box along the rod or arm 3 the light intensity will be increased as the box is moved farther away from the refractor, or decreased when moved toward the same due to the resistance in the circuit. The result, of course, is that the same amount of light passes from the chart to the eye at any distance the chart may lie with respect to the latter with a uniform winding of the resistance.

The rod 3 may be marked in inches therealong, of course, from the eye-end thereof outward, and at another side may be marked in diopeters as in present practice, the practitioner employing such markings in the customary way.

The rheostat is merely an adjunct and may not be employed although under certain conditions it may be desirable to make use thereof, since the practitioner may provide higher or lower illuminations with a given resistance of the wire 13.

While the lamp is shown and described herein as carried with the box that member may, perhaps, have a stationary position, its light rays being cast upon the chart to be reflected to the eye while its intensity is automatically controlled as before by a resistance element, or elements, as in the instance described. From a practical standpoint, however, the form of arrangement illustrated in the drawing, or its equivalent, is preferable, naturally.

While the rod or arm 3 is described herein as being supported by the refractor, phorometer, or other like device it may, of course, be otherwise supported while fixed with respect to such device.

In the present instance the apparatus of my invention under the construction shown and described may very readily be substituted for the parts now in general use without change in the structure otherwise.

Though the rheostat 10 is shown placed between the lamp and the current source it may be otherwise located and still serve the purpose as a resistance in addition to that offered by the element 13 for the change of light intensity.

What I claim is:

1. In a device of the nature and for the purpose described, the combination with a refractor including its testing lens, of a tubular arm carried by the refractor and having a slot in its wall extending lengthwise thereof, said arm paralleling the axis of the lens and extending from the front face of said refractor, a resistance element enclosed in the arm extending lengthwise of the same and adapted for connection with a source of current, a light-box suspended from the arm and shiftable therealong, a target and a lamp enclosed in said member, the former lying in line with the axis of the said lens, and a conductor connected with one side of the lamp and extending through the slot of the said arm to slidably engage the element, the other side of the lamp having means adapted to be connected with the current source.

2. The invention according to claim 1 including a manually controlled variable resistance in circuit with the lamp and the first named resistance through said conductor.

3. In a device of the nature described, the combination with a vision testing lens, of an arm disposed in fixed relation with respect to the lens and in its length substantially paralleling the axis of said lens, a resistance element connected with a source of electric current and extending along the arm, a light box mounted on the arm to shift therealong, a member fixed with respect to the light box connected with the current source and slidably engaging said resistance element, a chart in said light-box facing the lens and in line with the axis thereof, and a lamp connected into the electric circuit and with said resistance element through the slidable member.

JACK ARTHUR POTTER.